(12) United States Patent
Macri (10) Patent No.: US 6,283,621 B1
(45) Date of Patent: Sep. 4, 2001

(54) VEHICLE INTERIOR LAMP ASSEMBLY ADAPTED FOR USE WITH RECREATIONAL VEHICLES, OUTFITTED VANS, SHUTTLEBUSES AND THE LIKE

(75) Inventor: Gregory G. Macri, Elkhart, IN (US)

(73) Assignee: ASC Industries, Inc., Elkhart, IN (US)

( * ) Notice: Subject to any disclaimer, the term of this patent is extended or adjusted under 35 U.S.C. 154(b) by 0 days.

(21) Appl. No.: 09/325,986

(22) Filed: Jun. 4, 1999

(51) Int. Cl.[7] .................................. B60Q 1/00; B60Q 1/26
(52) U.S. Cl. ..................... 362/488; 362/479; 362/471; 362/490; 362/544; 362/245; 362/328; 362/337
(58) Field of Search ...................... 362/479, 488, 362/489, 490, 514, 549, 448, 493, 494, 85, 295, 245, 328, 337, 544

(56) References Cited

U.S. PATENT DOCUMENTS

| D. 124,607 | 1/1941 | Hutt ....................................... D26/36 |
| D. 358,674 | 5/1995 | Ramsey ................................. D26/28 |
| D. 393,729 | 4/1998 | Tuttle ..................................... D26/28 |
| 3,305,168 | 2/1967 | Ramniceanu ......................... 362/253 |
| 3,748,458 | 7/1973 | Morrison et al. .................. 240/41.55 |
| 4,086,483 | * 4/1978 | Freund et al. ........................ 362/311 |
| 5,582,474 | * 12/1996 | Van Order et al. .................... 362/74 |
| 5,938,321 | * 8/1999 | Bos et al. .............................. 362/494 |
| 6,015,222 | * 1/2000 | Schindler ............................. 362/490 |

OTHER PUBLICATIONS

Three sheets of photographs containing a pictorial representation of a partially disassenbledglobe type lamp assembly that has been on sale in the United States more than one year before the application filing date.

* cited by examiner

Primary Examiner—Thomas M. Sember
Assistant Examiner—Ali Alavi
(74) Attorney, Agent, or Firm—Van Dyke, Gardner, Linn & Burkhart, LLP (57) ABSTRACT

A vehicle interior lamp assembly comprises a light assembly carried within a housing. A cover is snap fit to the housing and carries a lens in registration with the light assembly. The light assembly includes a dome shape reflector, into which a light bulb is positioned, and a light switch slidingly positioned within a slotted flange attached to the housing. A light switch actuator, in operational connection with the light switch, is captured by the cover. The lens is formed with a double convex middle region and a pair of outer regions formed with a plurality of serrations which reflect light toward the light reflector to thereby provide a uniform pattern of illumination about a preselected area. In one preferred embodiment, the housing supports a pair of lighting assemblies to permit selective illumination of a passenger's seat, table, or the like.

35 Claims, 7 Drawing Sheets

VEHICLE INTERIOR LAMP ASSEMBLY ADAPTED FOR USE WITH RECREATIONAL VEHICLES, OUTFITTED VANS, SHUTTLEBUSES AND THE LIKE

BACKGROUND OF THE INVENTION

The invention relates generally to lamp assemblies. In particular, the present invention is directed to a vehicle interior lamp assembly which provides illumination within the interior of a vehicle. While the lamp assembly may find application in a wide range of vehicles, it is particularly adapted for use with a recreational vehicle, an outfitted van, a shuttlebus and the like.

Lamp assemblies are normally provided in the interior of a motor vehicle in order to provide illumination so as to enable occupants of the motor vehicle to read books, maps and other materials, locate objects within the vehicle and accomplish other tasks which require the interior to be illuminated. When illuminating the passenger side of the vehicle, these lamp assemblies must be capable of projecting light in a discrete area of the interior so as to provide sufficient illumination for one passenger while avoid illuminating the entire vehicle interior so as to avoid interfering with another passenger's ability to sleep, watch television, or the like. Consequently, the industry has advanced lamp assemblies which attempt to concentrate illumination within a particular area, such as the lap of a passenger in a particular seat, a table top or the like.

One common design advanced by the industry is a swivel or "globe type" lamp assembly, wherein the direction of illumination may be selectively altered by the vehicle occupant. A swivel lamp assembly normally includes a housing into which is placed a light housed within a spherical body or globe. The globe is movably positioned within the housing such that when desired, the occupant may move the globe within the housing to thereby aim the lamp in a particular direction. Although the "globe type lamp" is relatively successful in directing the light in a particular direction, it suffers from many disadvantages. The interconnection between the parts, specifically the housing and the globe is relatively expensive and complicated and may cause the lamp assembly to rattle or vibrate. Any tendency to vibrate would increase with the age of the lamp assembly, and would be most noticeable when the vehicle is driven at high speeds or on uneven terrain. Furthermore, since the illumination is focused upon a particularly narrow area, the globe type lamp often provides illumination about a narrow area which is too bright, and fails to provide uniform illumination within a large enough area to avoid the necessity for the ability to direct the beam. Furthermore, as these globe type lamps comprise a series of interconnected parts, at least one of which is moveable, the assembly is susceptible to mechanical failure and is often relatively expensive. Additionally, the lamp is housed in a relatively narrow cylindrical chamber which, if used continuously for prolonged periods of time, has a tendency to become hot to the touch and to discolor. Furthermore, these lighting assemblies are relatively difficult to install, due to the number of parts comprising the assembly.

Consequently, there exists a need for vehicle interior lamp assembly which is economical to produce, easily installed, and capable of providing a sufficient, uniform illumination pattern.

SUMMARY OF THE INVENTION

The present invention overcomes the difficulties encountered by the prior art by providing an interior vehicular lamp assembly which is economical to manufacture, easily installed and provides a uniform and broad, evenly distributed illumination pattern which provides sufficient light to the selected occupants of the vehicle. These features are accomplished with a minimum number of components that are easily assembled, thereby minimizing the potential for mechanical failure, enabling facial installation, and minimizing vibration of the assembly when the vehicle is in operation. The present invention may be configured as a single lamp assembly or a dual lamp assembly having a pair of lighting assemblies, each of which is configured to provide directed illumination toward a passenger seat, table or the like.

The lamp assembly, according to an aspect of the present invention, is comprised of a housing, into which is placed a lighting assembly, and a cover attached to the housing. The cover carries a lens in registration with the lighting assembly. A light switch actuator is captured by the cover and thereby precluded from separation from the cover. When the cover is attached to the housing, the light switch actuator is in operational connection with the light switch of the lighting assembly positioned within the housing. Capturing the light switch actuator holds the light switch actuator in place within the cover, thereby permitting assembly of the lamp assembly by simply attaching the cover to the housing. This in turn simplifies assembly and installation of the lamp assembly.

According to another aspect of the invention, the lamp assembly includes a light reflector nested within the housing. The light reflector has a non-linear, dome shape which partially surrounds a light bulb. The shape of the reflector is defined by its absence of sharp corners, while its perimeter is contoured to conform approximately to the irregularly shaped housing. By providing a light reflector having a dome shape without sharp corners, the light reflected therefrom is uniformly scattered to thereby avoid light intensity gradients. Avoidance of light intensity gradients provides a uniform broadcast of illumination. Furthermore, configuring the light reflector to have approximately the same peripheral shape as the interior surface of the housing maximizes the quantity of light reflected by the light reflector. Also, less light is permitted to contact the housing and thereby avoids thermal degradation of the housing material.

According to yet another aspect of the invention, the lens attached to the cover has a first region and at least one second region. The first region provides a substantially uniform and distributed light pattern about a defined area, while the second region reflects the light back toward the light reflector, and hence prevents illumination beyond the area defined by the first region. Preferably, the first region is a middle region having a double convex shape, while the second region is a pair of outer regions having a plurality of serrations projecting from the inner surface of the lens. Providing serrations about the outer region of the lens enables the lens to be manufactured having a variety of aesthetically desired shapes while providing a light illumination pattern which is defined by the double convex shaped middle region.

These and other objects, advantages and features of this invention will become apparent upon review of the following specification in conjunction with the drawings.

DETAILED DESCRIPTION OF THE PREFERRED EMBODIMENTS

The present invention advances a stationary, interior lamp assembly for a vehicle which provides directed illumination about a defined area. In one embodiment, the lamp assembly includes dual light assemblies, each of which is selectively actuated to illuminate either a passenger's lap, a table top or the like. In an alternative preferred embodiment, the interior lamp assembly includes a single light assembly which provides illumination for a particular passenger of the vehicle, or a table top, depending upon the placement of the lamp assembly within the vehicle interior. The present invention is particularly useful in the van conversion industry, the recreational vehicle industry, the shuttlebus industry and the like.

Figure 1:
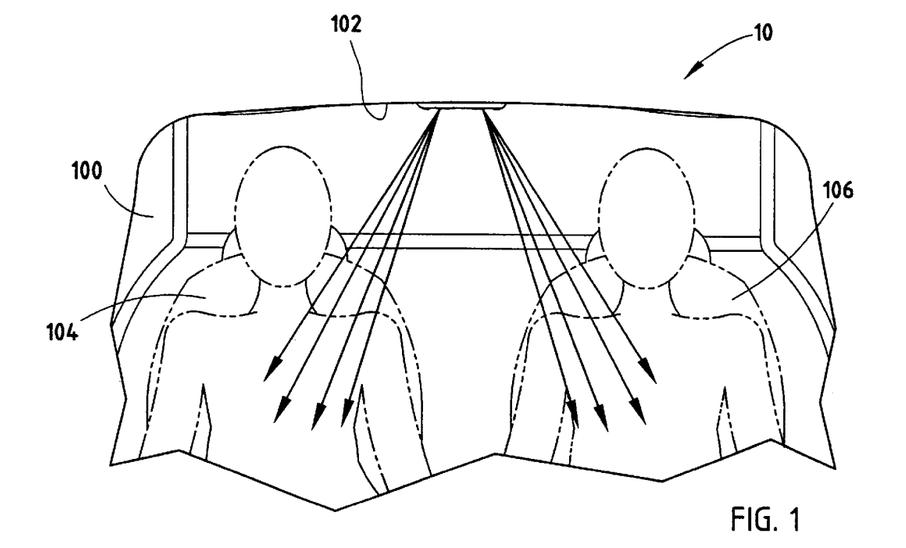
FIG. 1 is fragmentary, front view of a motor vehicle embodying a lamp assembly according to the present invention.
Figure 2:
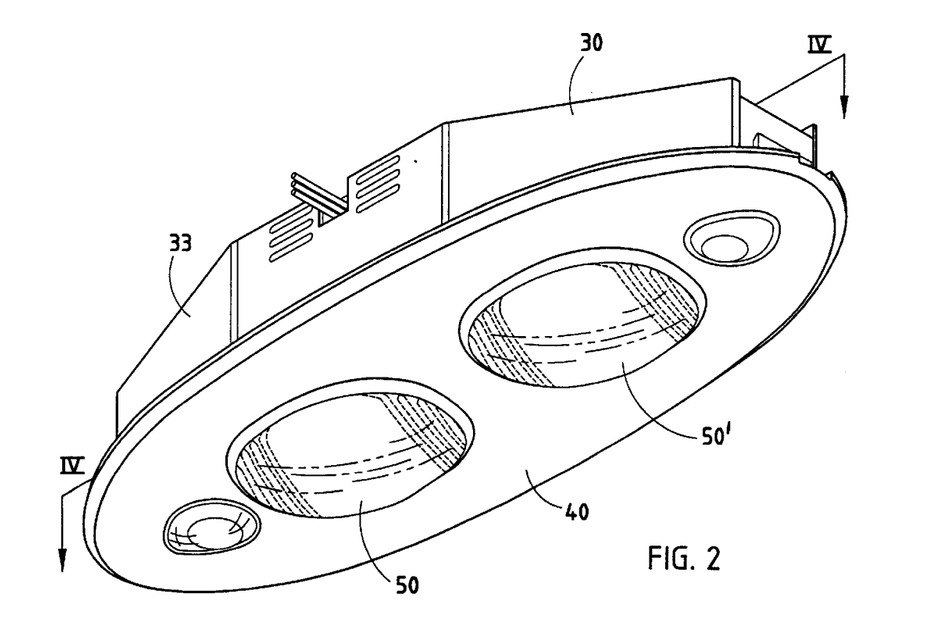
FIG. 2 is a perspective view of a lamp assembly according to a preferred embodiment of the present invention.

Referring now to FIG. 1, there is shown a lamp assembly 10, according to a preferred embodiment of the invention, positioned within the interior of a vehicle 100. Lamp assembly 10 is depicted as mounted to the interior surface 102 of the roof of vehicle 100, between one illumination area 104 and another illumination area 106. Each illumination area 104, 106 can be a lap of a passenger, a table, or the like. Lamp assembly 10 contains dual light assemblies, each of which provides directed illumination toward an illumination area 104, 106. It will be understood that the placement of lamp assembly 10 depicted in FIG. 1 is for illustrative purposes only, and that other mounting arrangements within vehicle 100 are within the spirit and scope of the invention. For example, lamp assembly 10 may be mounted to an overhead console attached to interior surface 102. Alternatively, lamp assembly 10 may be positioned in interior surface 102 so as to provide illumination for the occupants in the rear of vehicle 100 or, may be attached to either a side wall or the roof to provide directed illumination in a specific area.

Turning now to FIGS. 2 through 10, lamp assembly 10 comprises a pair of light assemblies 20 and 20' rigidly attached within the interior 32 of a housing 30. A cover 40 carries a pair of transparent lens 50 and 50', and is secured to housing 30. When cover 40 is secured to housing 30, each lens 50, 50' is in registration with light assembly 20, 20', respectively, to thereby enable light from light assemblies 20 and 20' to pass through lens 50, 50' in a preselected pattern, as will be discussed below. Lamp assembly 10 can be attached to vehicle 100 by any means commonly used in the industry. Preferably, housing 30 is formed with a plurality of attachment flanges 31 extending from side walls 33. A throughhole 34 is formed in each attachment flange 31, and is dimensioned to receive a screw or like fastener (not shown), thereby permitting attachment between housing 30 and vehicle 100. It will be recognized that when positioned within vehicle 100, lamp assembly 10 is preferably recessed within the particular surface to which it is attached. Further, it will be understood that when cover 40 is attached to housing 30, cover 40 will obscure attachment flanges 31 from view to thereby enhance the aesthetic appearance of lamp assembly 10.

Figure 3:
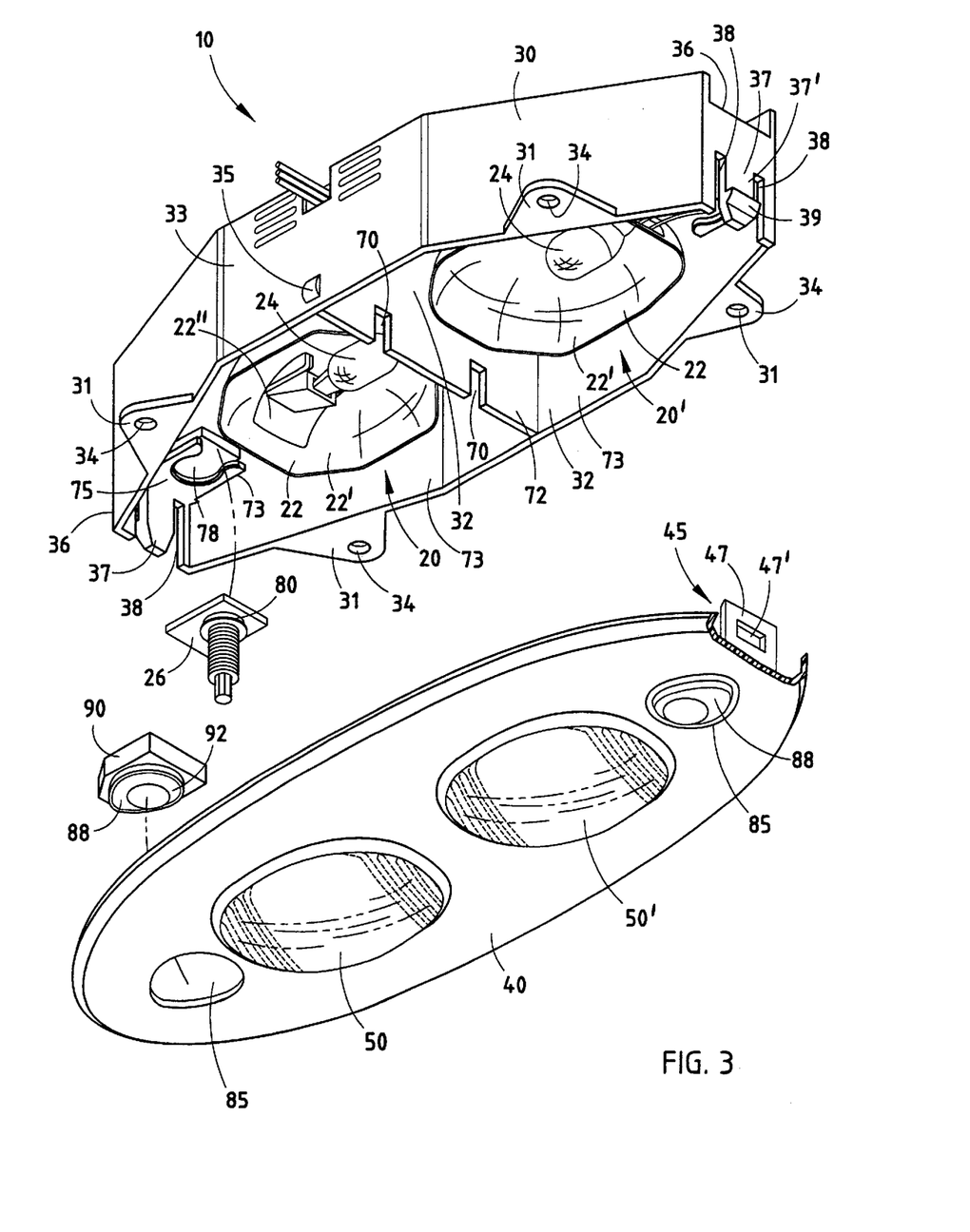
FIG. 3 is an exploded, perspective view of the lamp assembly illustrated in FIG. 2.
Figure 5:
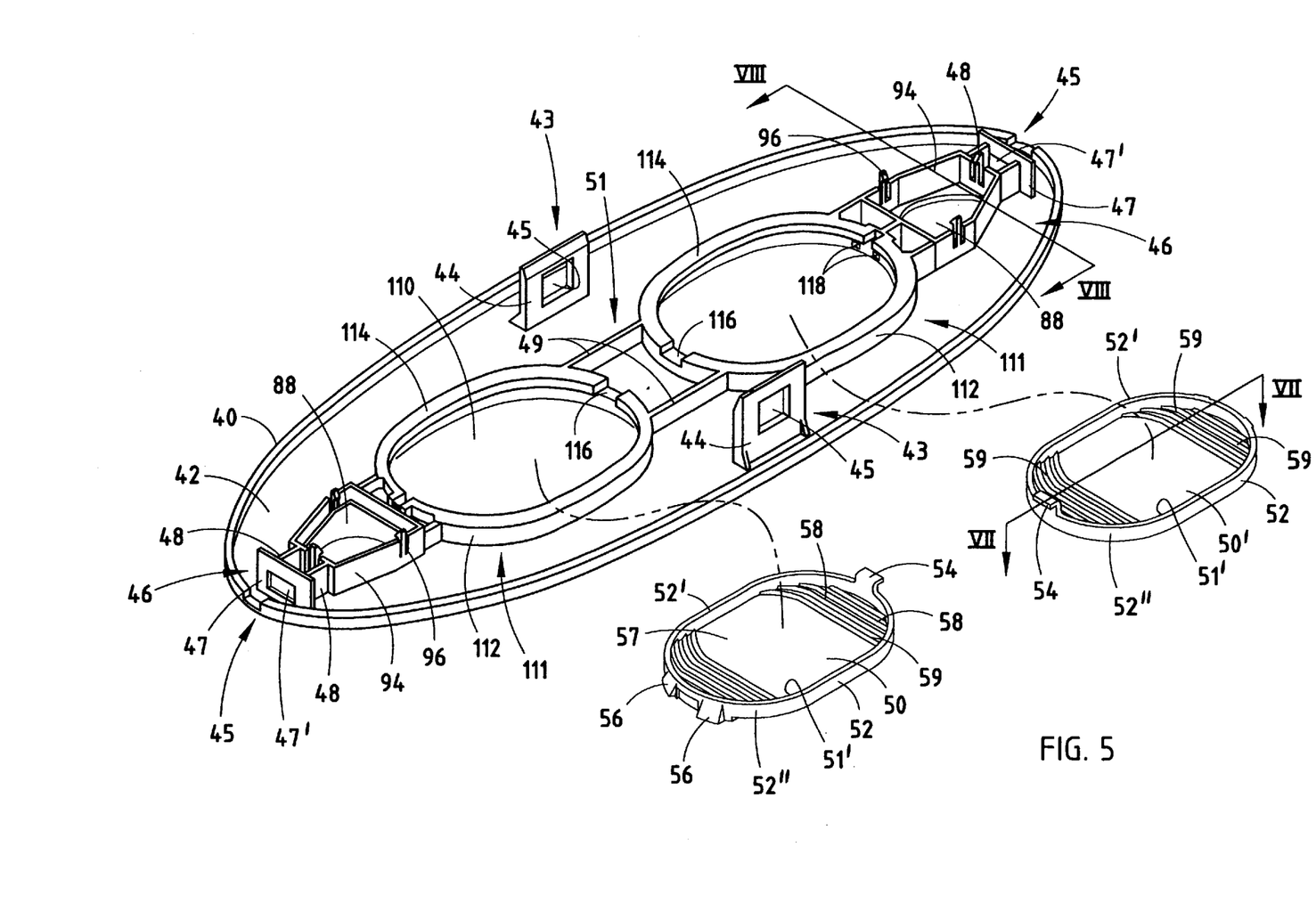
FIG. 5 is an exploded, perspective interior view of the cover and lens of the lamp assembly of FIGS. 2 through 4.

A first attachment assembly 43 is used to attach cover 40 to sides 33 of housing 30. First attachment assembly 43 includes a pair of side attachment members 44 extending from interior surface 42. Each side attachment member 44 is formed with a throughhole 45 dimensioned to receive a side wedge 35 positioned on exterior surface 33' of sides 33 of housing 30, or visa versa. Ends 36 of housing 30 may further contain an end member 37 separated by a pair of slots 38. A second attachment assembly 45 is used to attach cover 40 to ends 36 of housing 30. Second attachment assembly 45 includes a lip 39 formed on exterior surface 37' of each end member 37, and a pair of end attachment assemblies 46 extending from interior surface 42 of cover 40. Each end attachment assembly 46 includes a first member 47 formed with an opening 47' dimensioned to receive lip 39 of end member 37, and a pair of parallel members 48 placed a preselected distance apart to thereby slidingly engage slots 38. It should be understood that the location of end member 37 on housing 30 and end attachment assembly 46 on cover 40 could be reversed. A third attachment assembly 51 includes a pair of center support members 49, extending from interior surface 42 of cover 40, which engage a pair of slots 70 formed in a light assembly partition 72 positioned in housing 30, or visa versa. Thus, to secure cover 40 to housing 30, cover 40 is placed over housing 30, causing engagement between side wedges 35 and side attachment members 44 and end members 37 with end attachment assemblies 46.

Figure 4:
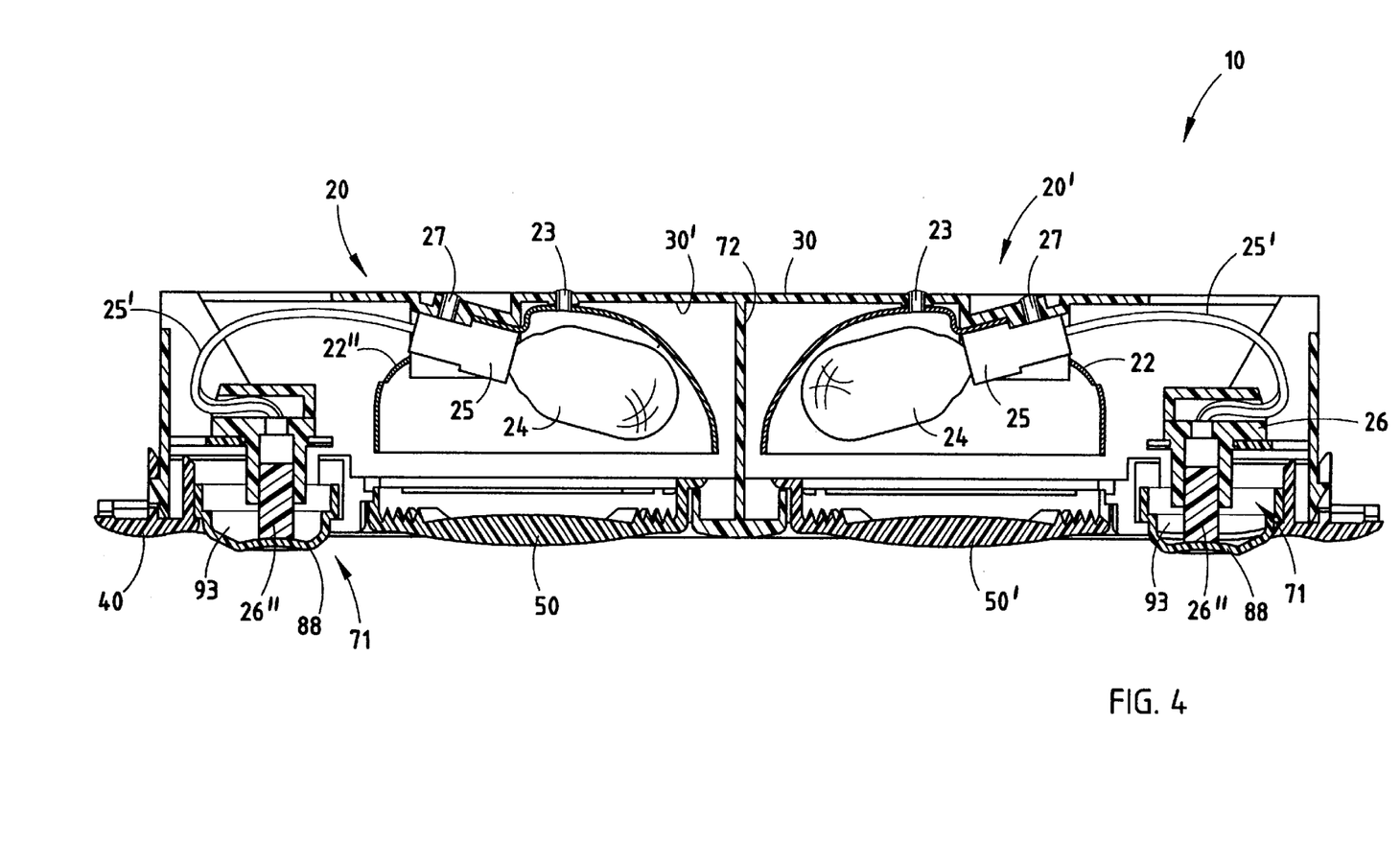
FIG. 4. is a sectional view taken along line IV—IV of FIG. 2.
Figure 9:
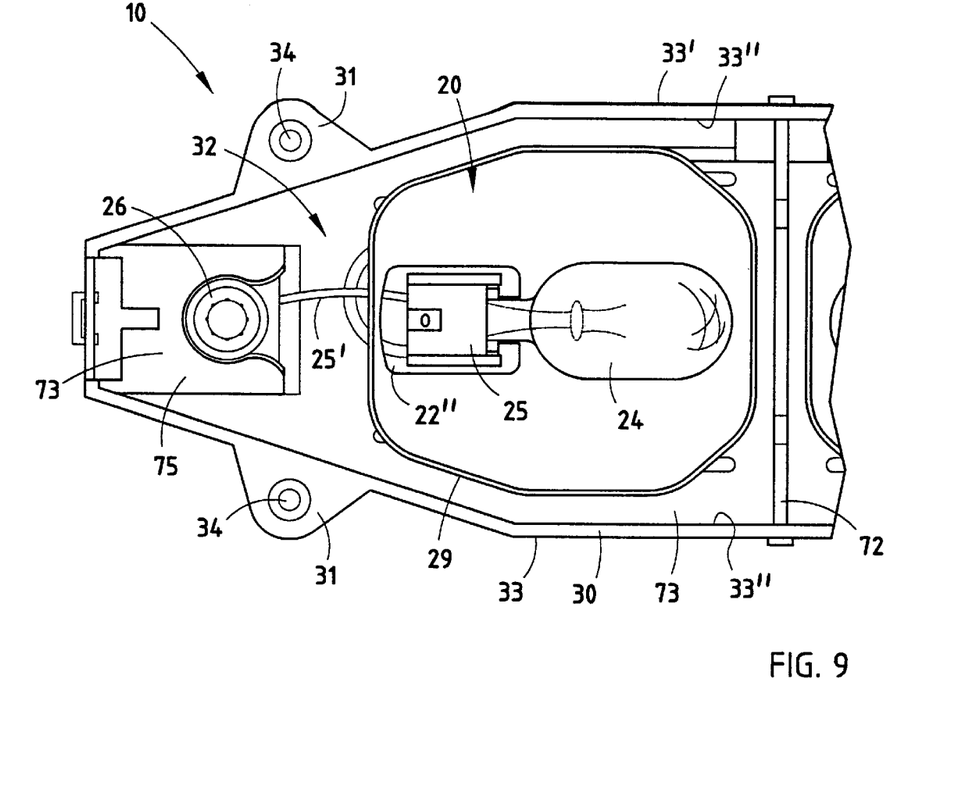
FIG. 9 is a fragmentary, top view of the housing of the lamp assembly of FIGS. 2 through 4.

Lighting assemblies 20, 20' are nested within housing 30, and each include a light reflector 22, a light bulb 24 and a light switch 26. Light reflector 22 is made of a reflective material and may be secured to floor 30' of housing 30 by a rivet 23 or like fastener. A lamp socket 25 is positioned within interior 22' of light reflector 22 and secured to housing 30 such as via rivet 27 or like fastener. A cut out section 22" in light reflector 22 forms a passage, permitting electrical wires 25', attached to light socket 25 and light switch 26, to pass therethrough, and to allow light socket 25 to be attached to housing 30. Light socket 25 is configured to receive light bulb 24. As best seen in FIGS. 4 and 9, light reflector 22 partially surrounds light bulb 24. Furthermore, light bulb 24 is placed at a slight angle off horizontal so as to provide optimum illumination towards lens 50 or 50' to thereby enable a uniform illumination pattern directed toward either illumination area 104 or 106. Light bulb 24 may be any light bulb commonly used in vehicle lamp assemblies by those with ordinary skill in the art.

For aesthetic appearance, lamp assembly 10 is boat shaped with the distance between sides 33 decreasing towards ends 36. The boat shape of housing 30 results in a light assembly mounting portion 73 of housing 30 having a non-uniform cross section. Preferably, light reflector 22 is dome shaped. Perimeter 29 of light reflector 22 is formed or contoured to substantially conform to the irregular shape of housing 30 with a minimum clearance provided between light reflector 22 and interior surfaces 33" of sides 33 of housing 30. Notwithstanding its conforming to the irregular shape of housing 30, interior surface 22' of light reflector 22 is characterized by its lack of sharp surfaces, permitting light reflector 22 to reflect light evenly in all directions. By reflecting light evenly in all directions, light intensity gradients in the pattern of illumination generated by lamp assembly 10 are avoided. These features increase the amount of light reflected by light reflector 22 and minimizes the quantity of heat absorbed by housing 30.

Figure 6:
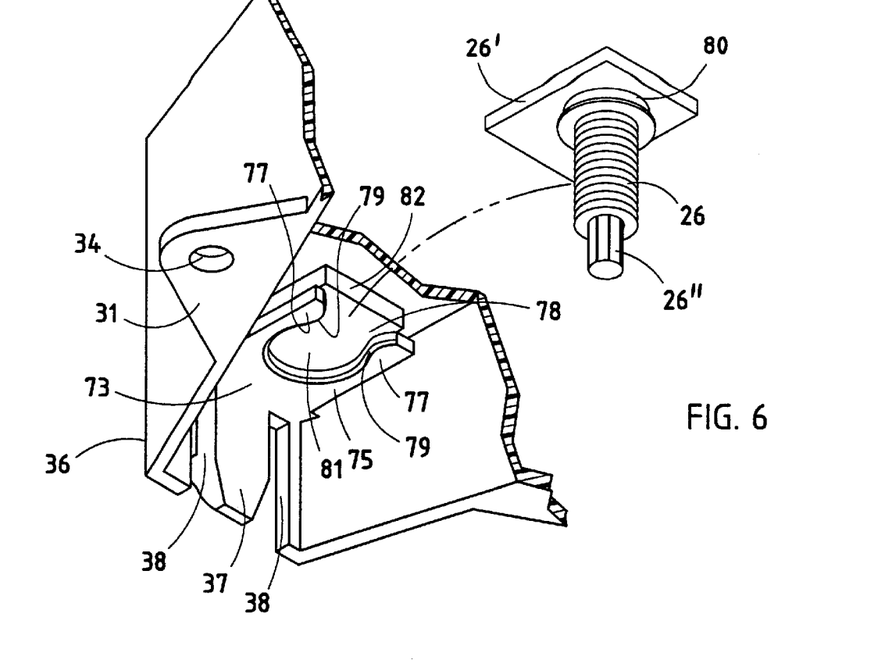
FIG. 6 is a fragmentary, detailed perspective view illustrating the attachment of the light switch to the housing.
Figure 7:
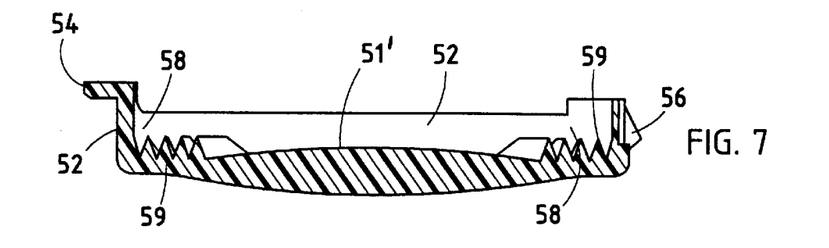
FIG. 7 is a sectional view taken along line VII—VII of FIG. 5.

Lamp assembly 10 further includes a pair of switch assemblies 71 electrically connected to a light assembly 20, 20'. As best seen in FIGS. 4 and 6, each switch assembly 71 includes a mounting base 73, and a pair of horizontal flanges 75, attached to ends 36 of housing 30 and extending within interior 32. Each switch assembly 71 further includes a light switch actuator 88 captured by cover 40. Each horizontal flange 75 is formed with a pair of legs 77 defining a slot 78 therebetween. Slot 78 is dimensioned to slidingly engage an annular groove 80 formed in light switch 26. Preferably, slot 78 decreases in width to a minimum width to form a pair of shoulders 79, and subsequently abruptly increases in width to form a closed, seating area 81. As light switch 26 is moved along slot 78, the application of a slight force is necessary to separate legs 77 until light switch 26 clears shoulders 79 and enters seating area 81. Once light switch 26 is positioned within seating area 81, shoulders 79 act as a barrier to prevent the unintentional removal of light switch 26 from flange 75 unless sufficient force is applied. A ledge 82 is positioned below horizontal flange 75 and frictionally engages bottom region 26' of light switch 26 to thereby secure light switch 26 within housing 30. When positioned in flange 75, pin 26" of light switch 26 will extend above the horizontal plane defined by the top of housing 30. In this manner, mounting base 73 secures light switch 26 to housing 30 without separate fasteners.

Figure 8:
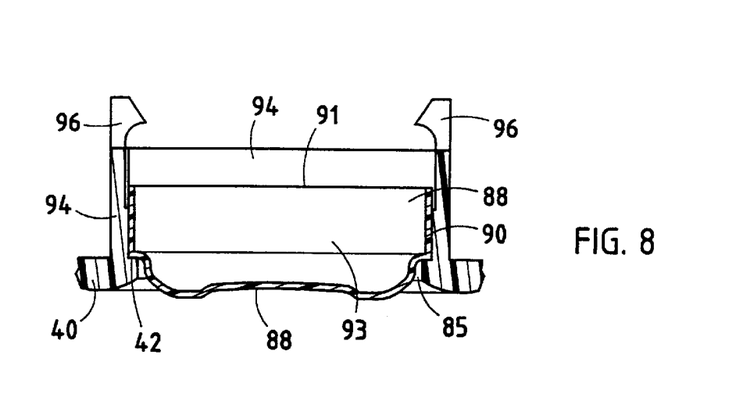
FIG. 8 is a sectional view taken along the lines VIII—VIII of FIG. 5.

Turning now to FIGS. 3, 5 and 8, cover 40 contains a pair of openings 85, each of which is dimensioned to receive a light switch actuator 88. A guide member 94 extends perpendicularly from interior surface 42 of cover 40, and is generally of the shape of light switch actuator 88. Guide member 94 contains a plurality of fingers 96 dimensioned to abuttingly contact edges 91 of main body 90, and thus capture light switch actuator 88 within cover 40. Light switch actuator 88 has a main body 90 and a raised member 92 extending therefrom. Raised member 92 is dimensioned to pass through opening 85 formed in cover 40, while main body 90 will abuttingly contact interior surface 42 of cover 40.

Light switch actuator 88 is placed within guide member 94 by application of a slight amount of force to momentarily deform fingers 96 outward. Once captured within guide member 94, light switch actuator 88 can be moved vertically within guide member 94 and is maintained therein by abutting contact between fingers 96 and edges 91 of main body 90. Light switch actuator 88 has a hollow interior 93 which receives pin 26" of light switch 26, when cover 40 is attached to housing 30 (FIG. 4). Consequently, depressing light switch actuator 88 moves pin 26" to thereby activate and deactivate light assembly 20 or 20'. This allows light switch actuator 88 to be manually captured within cover 40 so that fitting cover 40 to housing 30 juxtaposes light switch actuator 88 with light switch 26.

Cover 40 contains a pair of lens openings 110, each of which is dimensioned to accept a lens 50, 50' and a lens attachment assembly 111 for attaching a lens 50, 50' in a lens opening 110. Lens attachment assembly 111 includes a lens guide member 112 projecting from interior surface 42 of cover 40, and formed about the periphery of each lens opening 110. A ledge 114 extends inwardly from lens guide member 112. A groove 116 is formed in ledge 114, while a pair of openings 118 are formed in lens guide member 112.

Each lens 50, 50' contains a skirt 52 extending perpendicularly from inner surface 51'. A lip 54 projects from end 52' of skirt 52. Outer surface 52" of skirt 50 contains a pair of protrusions 56. To attach lens 50, 50' to cover 40, entering from exterior surface 42" of cover 40, lens 50, 50' is placed within lens guide member 112 so that protrusions 56 engage openings 118 of lens guide member 112. Thereafter, a slight force is applied to lens 50, 50' such that lip 54 clears ledge 114 and is placed within groove 116. When lens 50, 50' is attached to cover 40, end 52' of skirt 52 will abuttingly contact ledge 114 of lens guide member 112.

Figure 10:
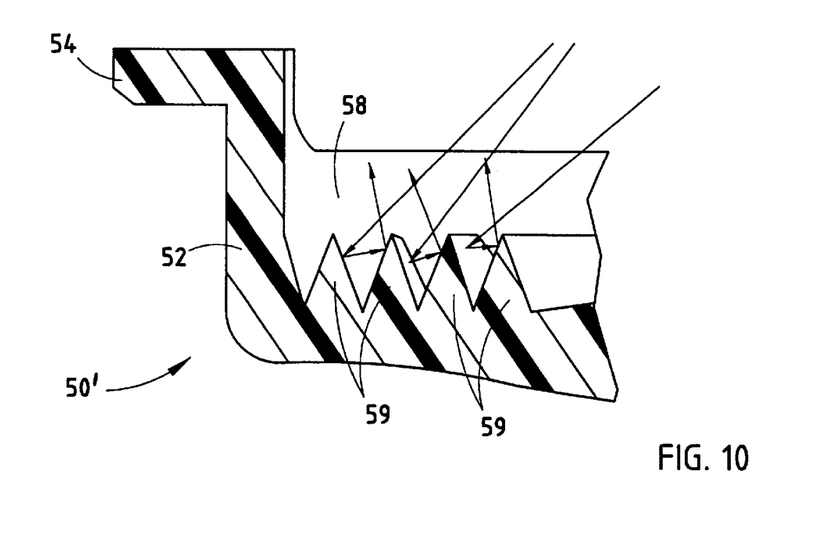
FIG. 10 is a fragmentary view of the lens depicting the reflection of light by the outer region.

Turning now to FIGS. 4 through 7 and 10, lens 50, 50' is formed having a middle region 57 and a pair of outer regions 58. A plurality of serrations 59 are defined in inner surface 51' of lens 50, 50' at outer regions 58. Serrations 59 direct light from light bulb 24 toward light reflector 22 and thus confines the pattern of illumination generated by lens 50, 50'. As shown in FIG. 10, the height and spacing between serrations 59 causes light from light bulb 24 (depicted by the directional arrows) to be reflected toward light reflector 22. Preferably, middle region 57 of lens 50, 50' has a double convex shape. The double convex shape of middle region 57 concentrates the light to thereby provide a focused pattern of illumination about a discrete area. It will be understood by those with ordinary skill in the art that serrations 59 in combination with the double convex shape of middle region 57 permit lens 50, 50' to be manufactured having a variety of aesthetically desirable peripheral shapes, while providing a desired pattern of illumination. Lens 50, 50' may be made of any transparent material commonly utilized in the art. Preferably, lens 50, 50' is made of a polymeric material. Most preferably, lens 50, 50' is made from a polycarbonate material.

Figure 11:
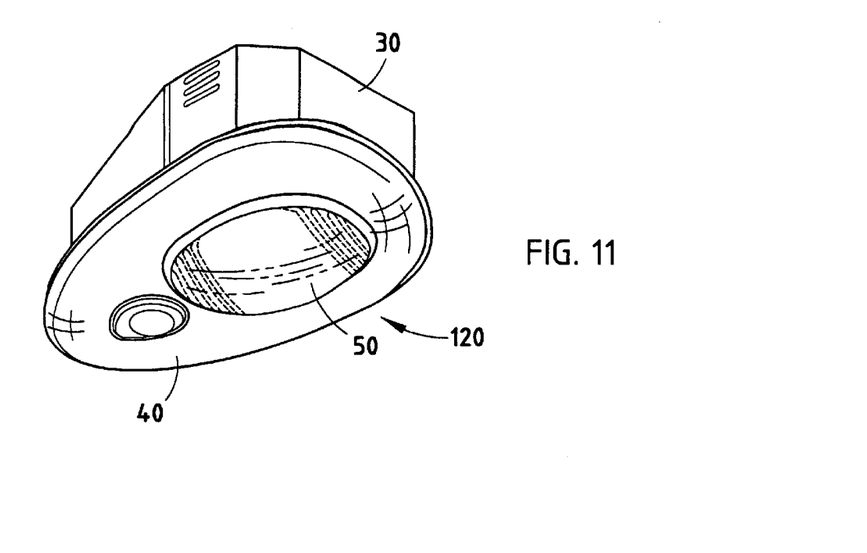
FIG. 11 is a perspective view of a lamp assembly according to an alternative preferred embodiment of the present invention.
Figure 12:
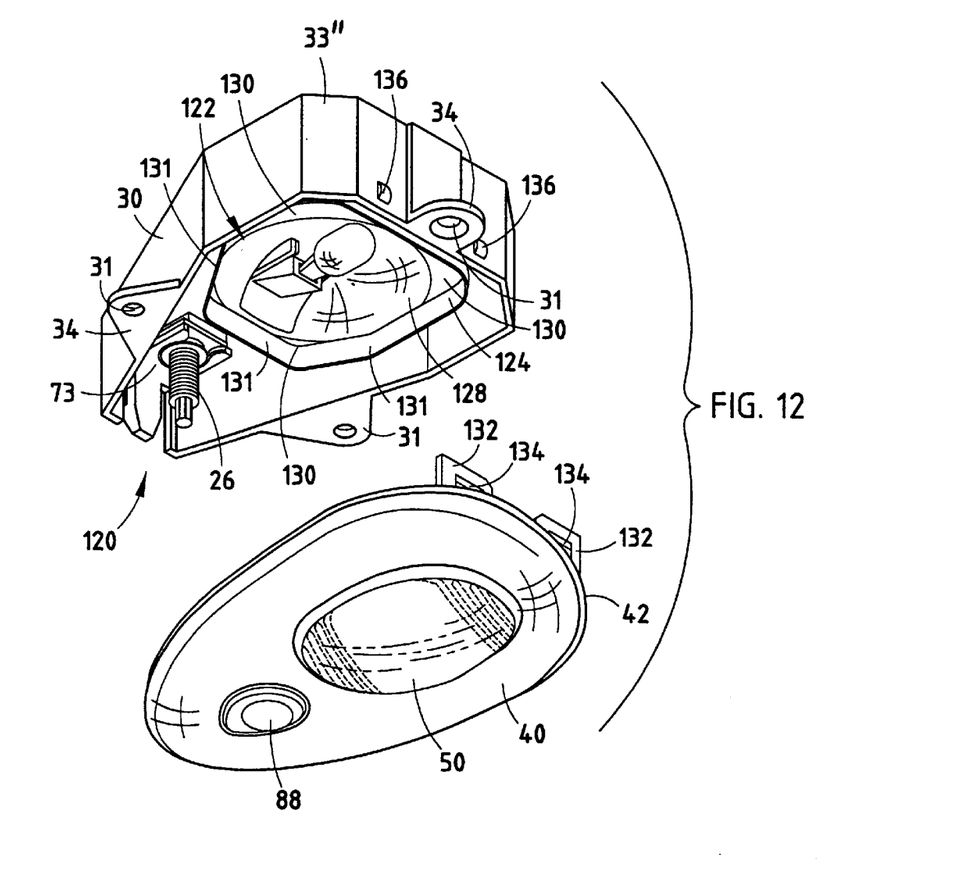
FIG. 12 is an exploded view of the lamp assembly illustrated in FIG. 10.

Turning now to FIGS. 11 and 12 there is shown a vehicle interior lamp assembly according to an alternative preferred embodiment of the present invention and generally designated by reference numeral 120. Lamp assembly 120 contains a single light assembly 122 having a light reflector 124. Interior 126 of light reflector 124 has a central spherical region 128. Surrounding central spherical region 128 is a plurality of horizontal ledges 130. Extending from horizontal ledges 130 is a vertical region 131. Central spherical region 128 of light reflector 124 provides light reflection directly above lens 50, which in turn permits lamp assembly 120 to be positioned directly above the area which is to be illuminated. For aesthetic appearance, lamp assembly 120 has a teardrop shape. Horizontal ledges 130 allow light reflector 124 to be contoured to approximately assume the irregular shape of housing 30 of lamp assembly 120.

Cover 40 of lamp assembly 120 is formed with a pair of end attachment members 132, projecting from interior surface 42. Each end attachment member 132 contains an opening 134 dimensioned to engage wedges 136 projecting from exterior surface 33" of housing 30. In all other aspects, lamp assembly 120 is structurally similar to lamp assembly 10.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principals of patent law, including the doctrine of equivalents.

What is claimed is:

1. A vehicle interior lamp assembly comprising:
   a housing adapted for attachment to an interior of a vehicle, said housing including a horizontal flange extending within said housing, said horizontal flange having a pair of legs defining a slot therebetween;
   at least one light assembly carried by said housing, said at least one light assembly including a light bulb, a light reflector partially surrounding said light bulb, and a light switch mechanism in electrical interconnection with said light bulb and attached to said housing, wherein said light switch mechanism has an annular groove, wherein said slot is dimensioned to slidingly receive said annular groove in said light switch mechanism;
   a cover having an interior surface;
   at least one lens carried by said cover, said at least one lens in registration with said at least one light assembly when said cover is attached to said housing; and
   at least one light switch actuator captured by said cover and in operational connection with said light switch mechanism when said cover is attached to said housing.

2. The vehicle interior lamp assembly as recited in claim 1, wherein said cover comprises a plurality of fingers dimensioned to abuttingly contact said at least one light switch actuator.

3. The vehicle interior lamp assembly as recited in claim 1, wherein said cover has a guide member extending from said interior surface, said guide member being in registration with an opening formed in said cover, wherein said guide member is dimensioned to receive said at least one light switch actuator, wherein said guide member is configured to retain said at least one light switch actuator within said guide member, and wherein said at least one light switch actuator is formed with a portion dimensioned to extend through said opening formed in said cover.

4. The vehicle interior lamp assembly as recited in claim 3, wherein said at least one light switch actuator further comprises:
   a main body; and
   a raised member extending from said main body, said raised member dimensioned to extend through said opening formed in said cover.

5. The vehicle interior lamp assembly as recited in claim 1, wherein said slot has a seating end and wherein the width of said slot gradually decreases toward said seating end to a minimum width, said minimum width being less than the width of said seating end.

6. A vehicle interior lamp assembly comprising:
   a housing adapted for attachment to an interior of a vehicle;
   at least one light assembly carried by said housing;
   a cover having an interior surface, wherein said housing and said cover are snap-fit together;
   at least one lens carried by said cover, said at least one lens in registration with said at least one light assembly when said cover is attached to said housing; and
   at least one light switch actuator captured by said cover, said at least one light switch actuator in operational connection with said at least one light assembly when said cover is attached to said housing.

7. The vehicle interior lamp assembly as recited in claim 6, wherein said at least one light assembly further comprises:
   a light bulb;
   a light reflector partially surrounding said light bulb; and
   a light switch mechanism in electrical interconnection with said light bulb and in operational connection with said at least one light switch actuator, said light switch mechanism attached to said housing.

8. The vehicle interior lamp assembly as recited in claim 7, wherein said light switch mechanism is slidingly attached to said housing.

9. A vehicle interior lamp assembly comprising:
   a housing adapted for attachment to an interior of a vehicle, said housing having a light assembly mounting portion, said lamp assembly mounting portion having a non-uniform cross sectional shape;
   a cover attached to said housing, said cover having an interior surface;
   at least one lens carried by said cover; and
   a light assembly positioned within said body, said lighting assembly having,
   a light reflector, said light reflector having a perimeter contoured substantially to the cross sectional shape of said light assembly mounting portion of said housing, said light reflector having an interior having a central spherical region and a plurality of substantially horizontal ledges extending from said central spherical region,
   a light bulb, said light bulb positioned in registration with said at least one lens, and
   a light switch carried by said housing.

10. A vehicle interior lamp assembly comprising:
    a housing adapted for attachment to an interior of a vehicle, wherein said housing has opposing sides, each side of said opposing sides having an exterior surface formed with a wedge;
    at least one light assembly carried by said housing;
    a cover having an interior surface, wherein said cover is formed with a pair of side attachment members extending from said interior surface, each side attachment member of said pair of side attachment members having an opening formed therethrough, said opening dimensioned to receive said wedge formed in each side of said opposing sides of said housing;
    at least one lens carried by said cover, said at least one lens in registration with said at least one light assembly when said cover is attached to said housing; and
    at least one light switch actuator captured by said cover, said at least one light switch actuator in operational connection with said at least one light assembly when said cover is attached to said housing.

11. The vehicle interior lamp assembly as recited in claim 10, wherein said housing has opposing ends, each end of said opposing ends having an end member, wherein said cover is formed with a pair of end attachment assemblies extending from said interior surface, said end attachment assemblies dimensioned to engage said end members formed in said housing.

12. The vehicle interior lamp assembly as recited in claim 11, wherein each end of said opposing ends of said housing is formed with a pair of vertical slots, wherein said end members are positioned between said slots, wherein each end member is formed with a lip, and wherein each end attachment assembly further comprises:
 a first member having an opening dimensioned to receive said lip formed in said end member; and
 a pair of parallel members placed a preselected distance apart, said parallel members slidingly received by said slots formed in said opposing ends of said housing.

13. The vehicle interior lamp assembly as recited in claim 6, wherein said at least one light assembly is two light assemblies and said housing further comprises a light assembly partition positioned between said two light assemblies.

14. The vehicle interior lamp assembly as recited in claim 13, wherein said light assembly partition is formed with at least one slot, and wherein said cover includes at least one center support extending from said interior surface, said at least one center support dimensioned to slidingly engage said at least one slot formed in said light assembly partition.

15. A vehicle interior lamp assembly comprising:
 a body adapted for attachment to an interior of a vehicle;
 at least one light assembly nested within said body; and
 at least one lens carried by said body, said at least one lens in registration with said at least one light assembly, said at least one lens having a first region configured to provide a pattern of illumination in preselected area, and at least one second region configured to reflect light generated by said at least one light assembly toward said light assembly.

16. The vehicle interior lamp assembly as recited in claim 15, wherein said body further comprises:
 a housing, said at least one light assembly nested within said housing; and
 a cover removably attached to said housing, said at least one lens attached to said cover.

17. The vehicle interior lamp assembly as recited in 16, wherein said at least one lens is substantially non-movably mounted within said cover.

18. The vehicle interior lamp assembly as recited in claim 16, wherein said light assembly further comprises:
 a light bulb;
 a light reflector, said light reflector reflecting light generated by said light bulb towards said at least one lens; and
 a light switch in electrical communication with said light bulb, said light switch slidingly received by said housing.

19. The vehicle interior lamp assembly as recited in claim 18, wherein said light reflector has a dome shape.

20. The vehicle interior lamp assembly as recited in claim 18, wherein said light bulb is partially surrounded by said light reflector.

21. The vehicle interior lamp assembly as recited in claim 15, wherein said first region is a middle region and said at least one second region is opposing a pair of outer regions, said middle region of said lens configured to concentrate said pattern of illumination in said preselected area, said pair of outer regions configured to reflect light from said at least one light assembly toward said at least one light assembly.

22. The vehicle interior lamp assembly as recited in claim 21, wherein said at least one lens has an inner surface proximate to light assembly and wherein said opposing outer regions are formed with serrations extending from said inner surface.

23. The vehicle interior lamp assembly as recited in claim 21, wherein said middle region of said at least one lens has a double convex shape.

24. The vehicle interior lamp assembly as recited in claim 16, wherein said at least one lens is formed with a skirt extending from the periphery of said at least one lens, said skirt having an end and an outer surface, and wherein said cover further comprises:
 an interior surface;
 a lens opening configured in the shape of said at least one lens; and
 a lens guide member projecting from said interior surface, said lens guide member positioned about the periphery of said lens opening, said lens guide member having an end formed with a ledge, wherein said at least one lens is positioned within said lens guide member such that said end of said skirt contacts said ledge.

25. The vehicle interior lamp assembly as recited in claim 24, wherein said ledge is formed with a cut-out section and said lens guide member is formed with at least one opening formed therethrough, and wherein said at least one lens further comprises:
 a lip projecting from said end of said skirt, said lip positioned within said cut-out section of said ledge; and
 at least one wedge projecting from said outer surface of said skirt, said at least one wedge positioned within said opening formed in said lens guide member.

26. A vehicle interior lamp assembly comprising:
 a housing adapted for attachment to an interior of a vehicle, said housing having a light assembly mounting portion, said lamp assembly mounting portion having a non-uniform cross sectional shape;
 a cover attached to said housing, said cover having an interior surface;
 a light assembly positioned within said body, said lighting assembly having,
 a light reflector, said light reflector having a perimeter contoured substantially to the cross sectional shape of said light assembly mounting portion of said housing,
 a light bulb, said light bulb positioned in registration with said at least one lens, and
 a light switch carried by said housing; and
 at least one lens carried by said cover, said at least one lens having a middle region and a pair of opposing outer regions, said middle region of said lens configured to provide a pattern of illumination in a preselected area, said pair of outer regions configured to reflect light from said at least one light assembly toward said at least one light assembly.

27. The vehicle interior lamp assembly as recited in claim 26, wherein said light reflector has a dome shape.

28. The vehicle interior lamp assembly as recited in claim 26, wherein said at least one lens has an inner surface proximate to said at least one light assembly and wherein said pair of opposing outer regions are formed with serrations extending from said inner surface.

29. The vehicle interior lamp assembly as recited in claim 28, wherein said middle region of said at least one lens has a double convex shape.

30. The vehicle interior lamp assembly as recited in claim 29, wherein said housing and said cover are snap fit together.

31. The vehicle interior lamp assembly as recited in claim 26, wherein said light switch is formed with annular groove and said housing further comprises a horizontal flange extending within said housing, said horizontal flange having a pair of legs defining a slot therebetween, said slot dimensioned to slidingly receive said annular groove of said light switch.

32. The interior vehicle lamp assembly as recited in claim 26, further comprising a light switch actuator in operational connection with said light switch, said light switch actuator captured by said cover.

33. An interior vehicle lamp assembly comprising:
   a housing adapted for attachment to an interior of a vehicle, said housing having a light assembly mounting portion, said lamp assembly mounting portion having a non-uniform cross sectional shape;
   a cover attached to said housing, said cover having an interior surface, said cover having a guide member extending from said interior surface, said guide member being in registration with an opening formed in said cover;
   at least one lens carried by said cover;
   a light assembly positioned within said body, said lighting assembly having,
   a light reflector, said light reflector having a perimeter contoured substantially to the cross sectional shape of said light assembly mounting portion of said housing,
   a light bulb, said light bulb positioned in registration with said at least one lens, and
   a light switch carried by said housing; and
   a light switch actuator in operational connection with said light switch, said light switch actuator captured by said cover, wherein said guide member is dimensioned to receive said at least one light switch actuator, wherein said guide member is configured to retain said at least one light switch actuator within said guide member, and wherein said light switch actuator is formed with a portion dimensioned to extend through said opening formed in said cover.

34. The interior vehicle lamp assembly as recited in claim 33, wherein said guide member further comprises a plurality of fingers dimensioned to abuttingly contact said at least one light switch actuator.

35. The vehicle interior lamp assembly as recited in claim 33, wherein said at least one light switch actuator further comprises:
   a main body; and
   a raised member extending from said main body, said raised member dimensioned to extend through said opening formed in said cover.

* * * * *